United States Patent Office 3,282,577
Patented Nov. 1, 1966

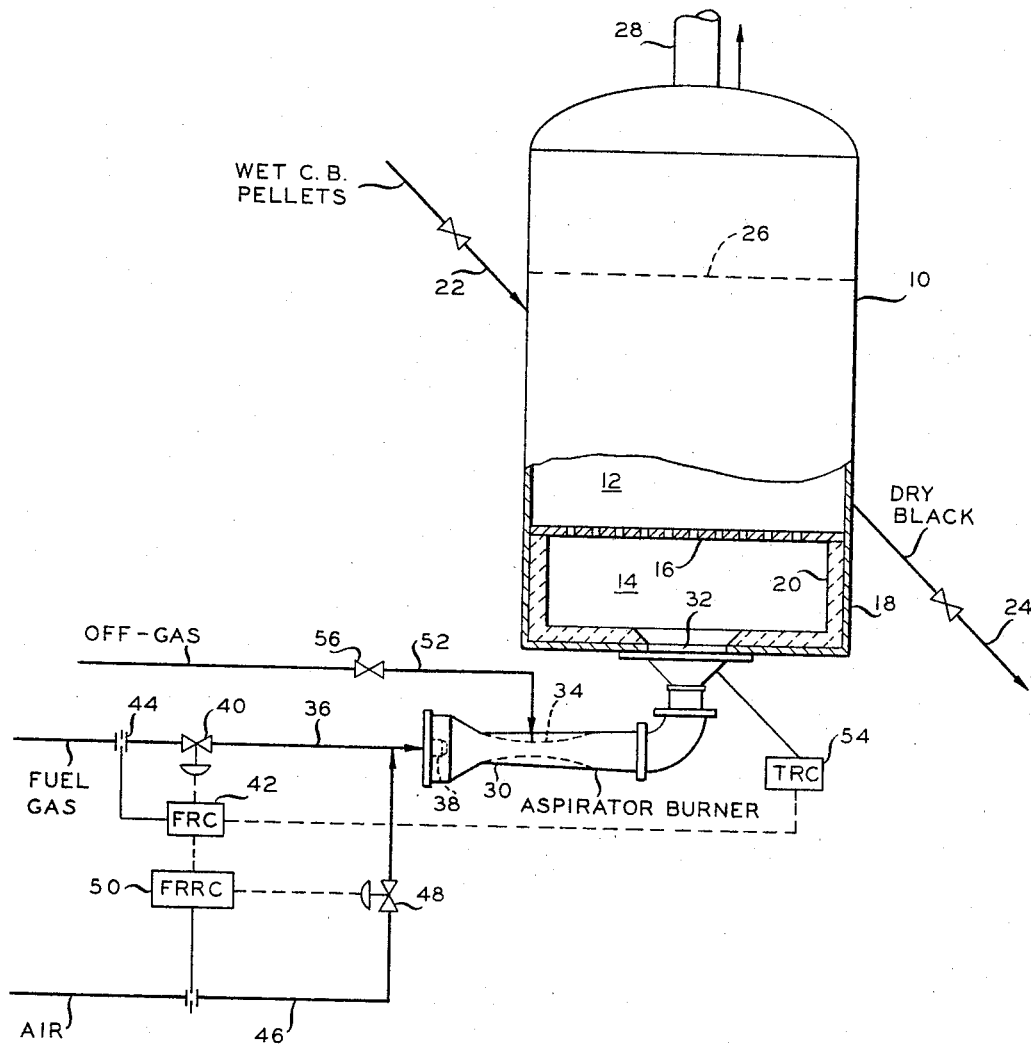

3,282,577
FLUIDIZED BED FOR DRYING CARBON BLACK
John E. Cottle, Bartlesville, Okla., assignor to Phillips Petroleum Company, a corporation of Delaware
Filed Dec. 23, 1963, Ser. No. 332,790
5 Claims. (Cl. 263—21)

This invention relates to an apparatus for the fluidized-bed drying of carbon black.

In the carbon black production art, it is conventional to wet pellet flocculent carbon black recovered from the effluent smoke from carbon black reactors. Various hydrocarbon feeds are partially burned and cracked to produce carbon black in various types of furnaces designed for such production and the reactor smoke is partially quenched and the carbon black is recovered therefrom by separation means including cyclone separators and bag filters. The relatively clean off-gas from the last filter, usually the bag filter, in the recovery system contains valuable fuel constituents including CO, $H_2$, and light hydrocarbons in relatively low concentration but sufficient to serve as useful fuel gas under proper combustion conditions. This off-gas is usually vented at a relatively low pressure such as 0.5 to 1.5 p.s.i.g., and at a temperature in the range of 400° to 550° F.

The recovered flocculent carbon black is pelleted with water which may contain a low concentration of molasses and potassium salt. The water content of the pelleted black is in the range of 40 to 60 weight percent of the pellets and usually about 50 percent. The wet pellets are transferred from the pelleter to a dryer which may be a gas-fired rotary drum dryer or a fluidized-bed dryer as disclosed in the copending application of Robert R. Goins, S.N. 249,682, filed January 7, 1962, now U.S. Patent No. 3,190,627. In said application the heated gas for the drying operation is supplied by a multiplicity of radiant burners.

This invention is concerned with an apparatus for fluidized-bed drying of wet carbon black pellets utilizing as a source of heat for fluidizing gas off-gas from the carbon black process such as the off-gas from the bag filter unit.

Accordingly, it is an object of the invention to provide an apparatus for drying wet carbon black pellets which conserve fuel and make use of normally wasted fuel elements. Another object is to provide a simple and effective arrangement of apparatus which controls the temperature of the fluidizing and drying gas in a fluidized-bed process. Other objects of the invention will become apparent to one skilled in the art upon consideration of the accompanying disclosure.

A broad aspect of the invention comprises burning a combustible mixture of fuel gas and air under substantial superatmospheric pressure in an aspirator type burner and aspirating off-gas from a carbon black process into the burner in substantial proportions whereby the fuel constituents of the off-gas and the sensible heat thereof are utilized in the carbon black drying process, the resulting hot gaseous mixture being passed upwardly through a fluidized-bed of wet pellets so as to dry same. The off-gas is introduced to the aspirating inlet of the burner at substantially the temperature at which it leaves the recovery system, i.e., a temperature in the range of 400° to 550° F. The amount of fuel gas burned with the off-gas is controlled so as to maintain an effluent burner temperature in the range of about 1000° to 1400° F. The off-gas from a carbon black process is usually at a pressure below 2 p.s.i.g. and cannot be utilized as fuel for producing drying gas for a fluidized-bed dryer without compressing the off-gas. By utilizing an aspirator type burner (containing a venturi) and feeding air and fuel gas at substantial pressure, such as in the range of 5 to 25 p.s.i.g. through the burner, the off-gas is aspirated into the fuel gas-air mixture and burned in the burner to produce a drying and fluidizing gas at substantial pressure and at a temperature in the range of 1000° to 1400° F.

A more complete understanding of the invention may be had by reference to the accompanying schematic drawing which shows one arrangement of apparatus for effecting the invention.

Referring to the drawing a fluidized-bed reactor 10 is divided into an upper drying compartment 12 and a lower gas distribution compartment 14 by perforate gas distribution plate 16. Reactor 10 comprises a metal shell 18 which is lined with refractory material 20 below distribution plate 16. Plate 16 is fabricated of high temperature alloy such as stainless steel. Pellet inlet means 22 and pellet outlet means 24 connect with compartment 12 at suitable levels. Dotted line 26 designates a suitable bed level maintained in the dryer. Stack 28 serves to vent off-gas from the dryer.

An aspirator type burner 30 is attached to the bottom of the dryer shell preferably at an axial position through inlet 32 of compartment 14. Venturi 34 is a necessary and functional element in burner 30. A suitable burner for use in the apparatus is available from Maxon Premix Burner Company of Muncie, Indiana which is available commercially under the trade name Ventite. A particularly applicable model of the Ventite burner is series SN Sealed Nozzle and Sealed Port Burner.

Fuel gas line 36 connects with injection nozzle 38 of burner 30 and is provided with motor valve 40. Flow rate controller 42 is sensitive to flow in line 36 upstream of valve 40 through orifice 44 and is in control of motor valve 40. Air supply line 46 connects with a source of compressed air and with fuel gas line 36 downstream of valve 40. Motor valve 48 in line 46 is under the control of or responsive to flow ratio controller 50 which is sensitive to the flow rate in line 46. Controller 50 is also responsive to flow rate controller 42 and proportions the air supply to the fuel gas supply, providing a stoichiometric excess of $O_2$ in relation to the fuel gas so as to provide for combustion of the off-gas aspirated by the burner through line 52 which is connected with the outlet or stack of a bag filter unit (not shown). Line 52 enters the aspirator inlet of burner 30 at the throat of venturi 34.

Air line 46 may connect directly with a second injector nozzle, such as nozzle 38, in the inlet end of burner 30.

A temperature recorder controller 54 is sensitive to the burner outlet temperature and is in overcontrol of flow controller 42, resetting the set point of the flow controller as the temperature of the outlet gas from burner 30 varies from a predetermined temperature in the range of 1000° to 1400° F. When temperature controller 54 changes the set point of flow controller 42, a signal is emitted by instrument 42 to ratio controller 50 which effects a change in the air flow rate by manipulation of valve 48. Valve 56 in line 52 is a hand operated valve which is normally open to provide full flow of off-gas which the aspirator burner will induce.

The burner 30 under normal operation aspirates from 35 to 60 volumes of off-gas from line 52 per 100 volumes of gas injected through nozzle 38. Typical off-gas from a bag filter of a carbon black recovery system has a B.t.u. heating value in the range of about 45 to about 80 per cubic foot. A typical analysis of an off-gas from a plant making FEF black is: 0.2 percent $C_2H_2$, 0.59 percent $CH_4$, 8.25 percent $H_2$, 8.5 percent CO, 2.8 percent $CO_2$, 38.66 percent $N_2$, and 41.0 percent $H_2O$. The percentages are in volume percent. These concentrations vary slightly from plant to plant depending upon the particular type of black being produced, the amount of water added by quenching, the type of axial fuel (whether gaseous or liquid), etc. Off-gas from some carbon black processes is combustible while the off-gas from other carbon black processes is not combustible without adding fuel gas thereto. However, any of these off-gas compositions will burn and supply heat to the burner off-gas when incorporated in the feed to the burner in accordance with the invention.

Certain modifications of the invention will become apparent to those skilled in the art and the illustrative details disclosed are not to be construed as imposing unnecessary limitations on the invention.

I claim:
1. Apparatus in combination comprising:
  (1) a fluidized-bed dryer in upright cylindrical form having
    (a) means for introducing pellets thereto,
    (b) means for withdrawing pellets therefrom,
    (c) a gas distribution plate across a lower section thereof separating said dryer into an upper drying compartment and a lower gas distribution compartment,
    (d) a gas outlet in the top thereof, and
    (e) a single hot gas inlet in the bottom of the gas distribution compartment of (c) axially disposed with respect to the dryer;
  (2) a single aspirator type burner positioned with its outlet end in communication with the inlet of (1) (e);
  (3) a pressure fuel line connected with the inlet end of the burner of (2);
  (4) a pressure air line connected with the inlet end of the burner of (2); and
  (5) an off-gas line connected with an aspiratory port of the burner of (2).

2. The apparatus of claim 1 including:
  (6) a motor valve in the fuel line of (3);
  (7) a flow-rate-controller sensitive to the rate of flow of fuel in the fuel line of (3) in control of the motor valve of (6);
  (8) a motor valve in the air line of (4); and
  (9) a flow-rate-ratio-controller sensitive to the rate of flow of air in the air line of (4) operatively connected with the controller of (7).

3. Apparatus in combination comprising:
  (1) a fluidized-bed dryer having
    (a) means for introducing pellets thereto,
    (b) means for withdrawing pellets therefrom,
    (c) a gas distribution plate across a lower section thereof separating said dryer into an upper drying compartment and a lower gas distribution compartment,
    (d) a gas outlet in the top thereof, and
    (e) a hot gas inlet in the bottom of the gas distribution compartment of (c);
  (2) an aspirator type burner positioned with its outlet end in communication with the inlet of (1) (e);
  (3) a pressure fuel line connected with the inlet end of the burner of (2);
  (4) a pressure air line connected with the inlet end of the burner of (2);
  (5) an off-gas line connected with an aspiratory port of the burner of (2);
  (6) a motor valve in the fuel line of (3);
  (7) a flow-rate-controller sensitive to the rate of flow of fuel in the fuel line of (3) in control of the motor valve of (6);
  (8) a motor valve in the air line of (4); and
  (9) a flow-rate-ratio-controller sensitive to the rate of flow of air in the air line of (4) operatively connected with the controller of (7).

4. The apparatus of claim 3 wherein the fluidized-bed dryer of (1) is in upright cylindrical form having a single axially positioned gas inlet to which the outlet of the aspirator burner of (2) connects.

5. The apparatus of claim 3 including a temperature-controller sensitive to the outlet gas temperature of the burner of (2) and in setting control of flow rate controller (7).

References Cited by the Examiner
UNITED STATES PATENTS

| | | | |
|---|---|---|---|
| 2,520,637 | 8/1950 | Henwood | 263—21 |
| 2,529,366 | 11/1950 | Bauer | 263—21 |
| 2,843,942 | 7/1958 | Whitsel | 34—10 |
| 3,116,119 | 12/1963 | Osburn et al. | 23—259.5 |

FREDERICK L. MATTESON, JR., *Primary Examiner.*

JOHN J. CAMBY, *Examiner.*